FIELD COTTON SCALE AND LOADING DEVICE
Filed Oct. 12, 1955
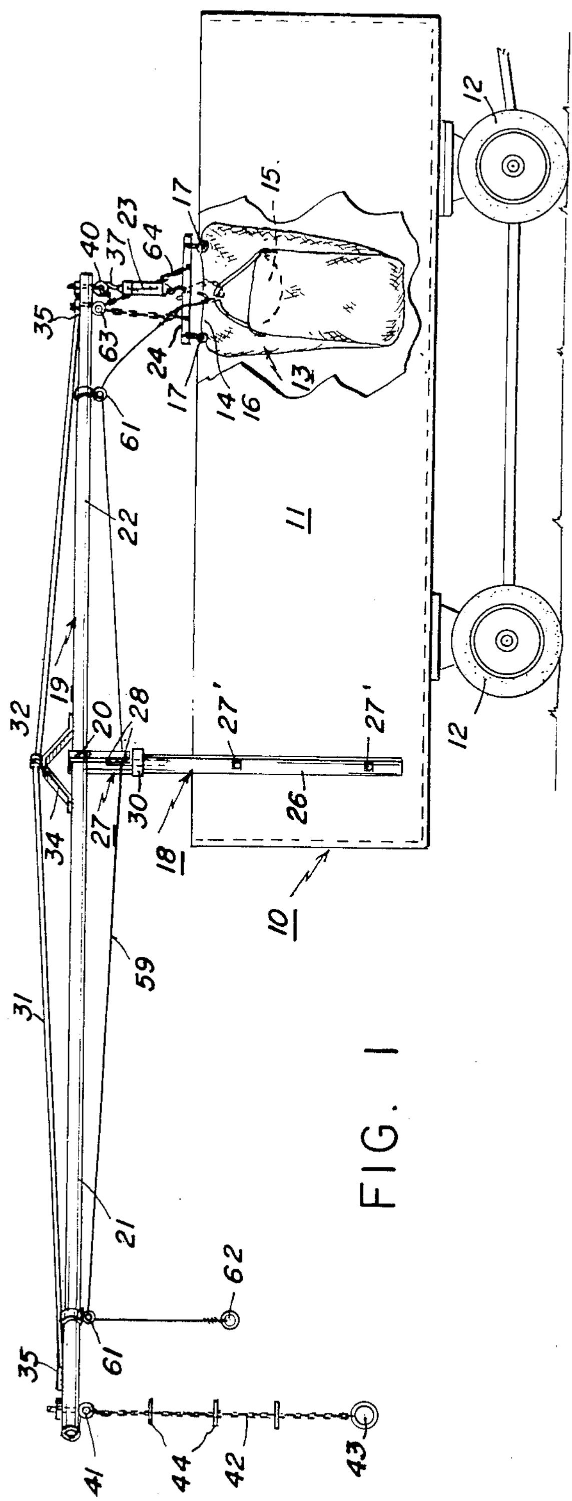
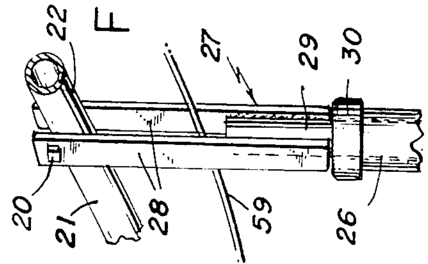
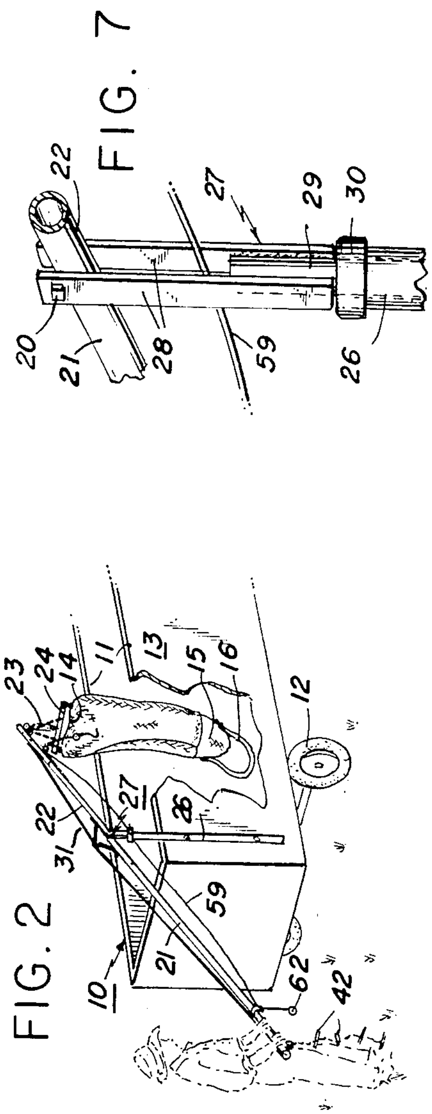
INVENTOR
GILBERT G. WHITE
BY H. B. Willson & Co.
ATTORNEYS FIELD COTTON SCALE AND LOADING DEVICE
Filed Oct. 12, 1955 2 Sheets-Sheet 2
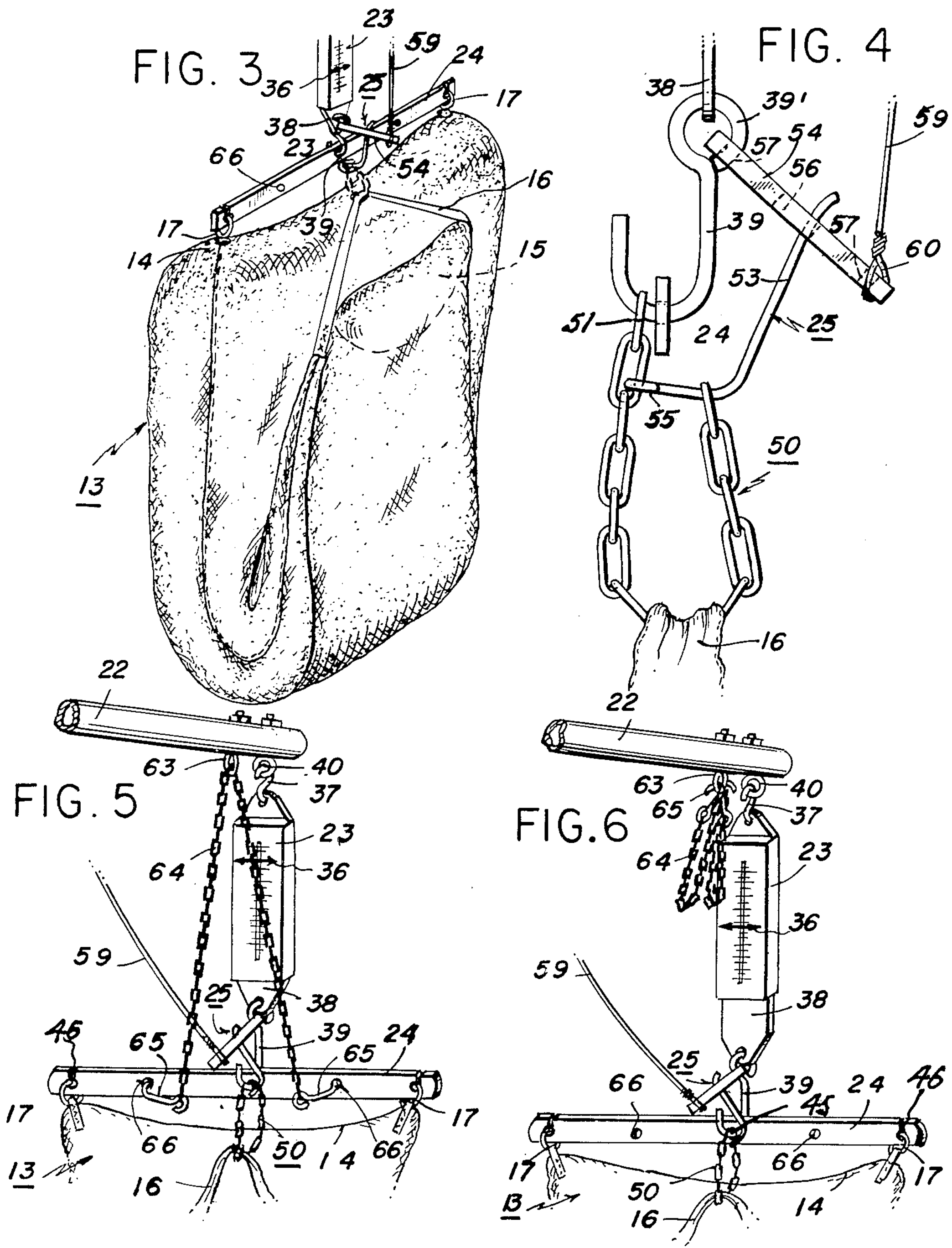
INVENTOR
GILBERT G. WHITE
BY H.B. Willson & Co.
ATTORNEYS United States Patent Office 2,756,984

Patented July 31, 1956

2,756,984

FIELD COTTON SCALE AND LOADING DEVICE

Gilbert G. White, Belle Mina, Ala.

Application October 12, 1955, Serial No. 540,026

6 Claims. (Cl. 265—52)

This invention is an improved mechanism for weighing cotton in the pick sacks in the field where the cotton has been hand picked and then loading the cotton in the body of a trailer, truck, tractor or the like.

While various labor saving devices and mechanisms have been proposed for weighing cotton and other crops in the field and loading the same into a vehicle body, they have not come into extensive use on cotton farms, and at present the method of weighing and loading hand picked cotton in the field is the same as what has been practiced for about a century. In that old procedure men, women and children go into the field with a cotton pick sack about 7½′ long, the sack having a shoulder strap at its mouth. When the picker fills the sack with about 65 pounds or more of cotton he carries it to the weighing scale located near a wagon on a side of the cotton field. The weigher and his helper then hang the pick sack on the scale and the gross weight is noted. Then the filled sack is thrown up into the vehicle body the top of which may be about 8 feet from the ground. If a man is not in the wagon body, one must climb into it and with much effort hold the sack up side down and shake the cotton out of the sack. The latter is then thrown to the weigher who weighs the empty sack to determine its weight. After deducting the sack weight from the gross weight, the picker is paid for the cotton picked. A good picker will fill his sack five times during a day. Some cotton farmers have as many as 150 pickers in his field a day; and in such case he would have 750 weighings. The weighing and loading are slow and arduous, and are considered the hardest job on the cotton farm.

The principal object of the invention is to provide improved means for weighing and loading cotton in the field, which will save time, reduce manual labor to the minimum, and result in cleaner, and hence more valuable, raw cotton, since no man with dirty boots need be in the vehicle body to remove the cotton from the pick sacks.

The invention contemplates a lever mounted between its ends for both vertical and horizontal swinging movements and supported from the body of the trailer or other vehicle, with a spring scale on one end of the lever, and a simple and effective means for suspending the now commonly used pick sack from the scale, so that one man standing on the ground may lift a sack full of cotton so a weigher may read the scale, then lift the weighed sack over the vehicle body, operate a trip cord to drop the open end or mouth of the sack so the cotton can drop out of it, shake the inverted sack so that the entire contents of it will be discharged into the body, and finally swing the empty sack, while still on the scale, back to the location of the weigher so that the latter may weigh the empty sack. Thus it is unnecessary for a man to get into the wagon, and possibly soil the cotton, and the weighing and loading operations are greatly speeded up and much physical exertion will be saved.

Another object is to provide a disconnectable connection between the sack supporting member and the lever to relieve the spring scale from excessive motion and wear when the sack is shaken and to increase the effectiveness of the shaking operation.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of a vehicle body showing one application of the invention, the lever being shown in a horizontal position and a filled sack suspended therefrom and within the body, a portion of the side wall of the body being broken away;

Fig. 2 is a detail perspective view showing the lever in an inclined position and a sack suspended from the elevated end of the lever and in an inverted position for dropping the cotton;

Fig. 3 is a perspective view showing the sack suspending means with a filled and folded sack thereon;

Fig. 4 is a detail view on an enlarged scale showing the releasable means for supporting the shoulder strap at the mouth of the pick sack;

Fig. 5 is a detail perspective view showing the sack suspending means with the scale relief chains in operative position;

Fig. 6 is a similar view showing the scale relief chains disconnected from the sack supporting bar; and Fig. 7 is an enlarged detail perspective view of the swiveled mounting of the lifting lever.

Referring more in detail to the drawings the numeral 10 denotes an open top body of a vehicle such as a wagon, trailer, truck, or tractor. As shown the body is rectangular with a surrounding high wall 11 and is mounted on suitable supporting wheels 12. The numeral 13 denotes the usual elongated cotton picker's sack made of fabric and having a closed bottom 14. One of the two side walls of the sack is made longer at the mouth or open end 15 of the sack and to such end is fastened a flexible shoulder strap 16. At the ends of the bottom 14 are fastened metal harness rings 17.

The invention contemplates the use of a standard 18 preferably mounted on the body 10 with a long lever 19 mounted between its ends at the top of the standard for both vertical tilting and horizontal swinging movements. The straight lever may be about 21′ long and swings vertically on a horizontal pivot 20 so located that the lever has a rear arm 21 of about 12′ in length forming a handle or operating end and a front arm 22 of about 9′ in length to support a spring scale 23 which carries a sack supporting cross bar or arm 24, releasable means 25 being supported from the scale for holding the shoulder strap of the sack when the latter is in a folded condition. The standard comprises a stationary lower section 26 and a removable upper section 27 mounted for rotation about a vertical axis and carrying the pivot 20. The lower section 26 may be a piece of 1¼″ pipe fastened by bolts 27 to the other face of one of the sides of the body wall 11 with its upper end projecting above the wall. The upper section 27 comprises a pair of opposed rectangular metal bars 28 which have their lower ends welded to the opposite sides of the upper portion of a 12″ length of pipe 29, the lower portion of which fits and is rotatable in the upper end of the standard section 26, and this pipe is the vertical pivot about which the lever swings horizontally. The upper end of the section 26 may have welded to it a pipe cap 30 drilled to removably receive the pivot 29 and on which the lower ends of the bars or plates 28 rest. The bars form a fork between the upper portions of which the lever 19 is disposed, the pivot 20 being a bolt or the like which passes through these parts.

The lever 19 is preferably a long piece of 1½″ pipe or tubing and in order to prevent it from bowing a steel truss rod 31 extends along its top. The rod passes through a short tube or eye 32 welded to the top of an inverted V-shaped bracket 34 welded to the lever and disposed over the pivot 20, the ends of the rod being welded at 35 to the lever adjacent its ends.

The spring scale 23 is of well known form having an elongated body with a slot in its flat front for the movement of a pointer 36 which coacts with scale graduations along the slot. At the top is a swivelled suspending hook or eye 37, and from its bottom extends a slidable member 38 which is operatively connected to the pointer and provided with an opening to receive the eye 39′ of a loaded suspending hook 39. The suspending element 37 is engaged with an eye bolt 40 in the lever at its front end. A similar eye bolt 41 is at the rear end of the lever for the attachment of a pull cord or chain 42. The latter may have a hand ring 43 at its lower end and one or more spaced hand holds 44 on its intermediate portion.

The cross member 24 to which the bottom of the sack is connected, is a straight flat metal bar about 2′ long with a transverse opening 45 midway of its ends to receive the scale hook 39. Near each end of the bar 24 its upper edge is formed with a notch 46 with which one of the rings 17 at the ends of the sack bottom may be engaged. The filled sack is doubled or folded upon itself, and after the rings 17 have been engaged with the notches 46, a short section 50 of a chain is passed through the shoulder strap 16. A link 51 at or near one end of the chain is engaged with the hook 39 as seen in Fig. 4. One of the links at or near the other end of the chain is engaged with a latch hook 53 which is swingably suspended on an intermediate link of the chain and is releasably held by a trip lever 54, these parts constituting the releasable means 25 for supporting the shoulder strap 16. The hook 53 is a substantially L-shaped metal rod with an eye 55 at its short arm engaged with a chain link adjacent the end 51. The trip lever 54 is a flat and thick strip of metal preferably bent, as seen in Fig. 4, with an opening at its upper end engaged with the eye 39′ of scale hook so that the lever may swing vertically. Formed in the intermediate portion of the lever is a longitudinally extending slot 56 to receive the free end of the latch hook 53. The other end of the lever 54 is formed with a hole 57 in which one end of a trip cord 59 may be tied as at 60. The latch lever is heavy and its weight holds it engaged with the hook 53. The other end of the trip cord or line is within reach of the man who manipulates the operating end 21 of the lever. The line 59 extends along the underside of the lever passing through the fork formed by the bars 28 and through guide eyes 61 which are adjacent the ends of the lever and may consist of chain links welded to the lever. The free end of the pull cord hangs adjacent the lever pull cord 42 and may carry a hand ring 62.

The use and operation of the invention should be apparent from the foregoing detailed description. One of the fixed standard sections 26 is mounted on each of the trailers used, so that when one has been loaded with cotton, the rest of the device may be removed as a unit and mounted on an empty trailer by dropping the pivot 29 into the upper end of the section 26 on that trailer. The pull cord 42 permits the sack supporting cross bar 24 to be lowered close to the ground so that a folded sack upon the ground may be attached to it and to the trip mechanism by the weigher. The man operating the lever then lifts the sack off the ground so that the gross weight of the filled sack may be noted. The lever operator then further moves the swivelled lever to position the suspended sack above that part of the trailer body where it is desired to discharge the cotton. He then pulls the trip cord 59 to move the trip lever off the free end of the latch lever 54, and the latter then swings downwardly and the chain slips off it and releases the shoulder strap 16. The sack is then held in an inverted position so that the cotton may drop out of it. By moving the lever up and down the sack may be shaken so that all of the cotton will be discharged. The lever operator then moves the lever to suspend the scale and the sack upon it, in front of the weigher so that the weight of the empty sack may be noted. The weighing and loading of cotton may thus be done quickly and with little manual effort by two men, although the work can be done by one man if he mounts on the ground suitable anchors to which the lever operating cord 42 may be fastened. The use of the invention eliminates repeated lifting of the sack by hand, the hard labor of throwing a full sack up into the trailer body, and the hard labor of a man in the body shaking the cotton out of the sack.

While much time and effort are saved by the use of the invention as above described, the spring scale is subjected to considerable wear and tear when the sack is being emptied and it requires more time and effort to completely empty the sack because of the spring connection between the sack and the lever end 22. I therefore prefer to provide a removable connection between the lever and the sack suspending cross bar 24 to relieve the scale of excessive movement and permit the sack to be more effectively jolted during the emptying operation. That may be accomplished by attaching the upper ends of two short chains 64 to the eye of an eyebolt 63 fixed in the lever 22 adjacent the scale suspending eye 40. The free ends of these chains have hooks 65 adapted to be engaged with holes 66 formed in the sack suspending bar 24 about nine inches from the center hole 45 as seen in Fig. 5.

The chains 64 are of such length that the spring member 38 of the scale may have only limited movement in a downward direction when the releasable means 25 has been tripped to release the shoulder strap 16. It will therefore be seen that when the lever is manipulated to shake the cotton out of the sack, the latter will be jolted when the chains or equivalent flexible connections 64 become taut, and hence the sack may be more quickly and effectively emptied. Another advantage is that the scale will be relieved of wear and tear since the member 38 will be pulled down to only a limited extent during the shaking operation. During the weighing of a filled sack the hooks 65 may be engaged with the eye 63, as shown in Fig. 6, and hence will be ineffective and out of the way. For the sake of clearness, the scale 23 is shown in some of the figures, particularly Figs. 5 and 6, in a reversed position and the chains 64 are shown in front of the scale. While these parts may be so positioned, the front of the scale will ordinarily face forwardly from the outer end of the lever 19 and the chains 64 will be in rear of the scale so as not to interfere with the reading of the scale.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A field cotton weighing and loading mechanism comprising in combination a manually operated lever, a lever supporting standard having a lower section for fixed mounting on a vehicle having an open top body and an upper section with a vertical pivot removably mounted for rotation at the top of the lower section, a horizontal pivot mounting an intermediate portion of said lever on said upper section, a spring scale supported on the front end of said lever and having a downwardly movable element with a hook suspended therefrom, a cross bar having a length substantially equal to the length of the closed bottom of a cotton pick sack having rings at the ends of its bottom and a shoulder strap at its open top, said bar having an opening midway of its length to receive said hook and notches at its ends to receive rings on the sack, a chain to be passed through the shoulder strap when the sack is folded upon itself, one end portion of the chain being engaged with said hook, a latch hook swingably supported from said scale hook and having a free end to enter a link of said chain beyond the engagement of the latter with the shoulder strap, a trip lever swingably supported from the scale hook and having an opening to receive the free end of said latch hook, and a trip cord having one end attached to said trip lever, the other end of said cord being within reach of the lever operator.

2. The structure of claim 1, together with flexible means detachably connected between said lever and said cross bar to limit the movement of the scale.

3. In a field cotton weighing and loading mechanism, a swingable manually operated lever, a spring scale supported from the lever and having a load supporting hook, a cross bar supported at its longitudinal center from said hook, means removably attaching the closed bottom of a cotton pick sack to said bar, a chain to be passed through the shoulder strap at the open end of the sack when the latter is folded upon itself, one end portion of said chain being engaged with said hook, a latch hook swingably supported from said scale hook and having a free end to be passed through the shoulder strap of the sack, a trip lever swingably supported and having an opening to receive the free end of said latch hook, and a pull cord attached to said trip lever for disengaging it from the latch hook.

4. The structure of claim 3 together with a pair of scale relief chains connected at their upper ends to said lever, and detachable connections between the lower ends of the last mentioned chains and intermediate portions of said cross bar on opposite sides of its center to limit the movement of the scale.

5. In a field cotton weighing and loading mechanism, a swingable manually operated lever, a spring scale supported from the lever and having a load supporting hook, a cross bar supported at its longitudinal center from said hook, and having notches at its ends, a foldable cotton pick sack having a closed bottom, an open top and a shoulder strap at said top, rings at the ends of the sack bottom engaged with said notches to support the sack, a chain passed through the shoulder strap and having one end portion supported from said hook, a latch engaged with the other end portion of the chain and having one end swingably supported from the scale hook, a weighted trip lever swingably supported from the scale hook and having an opening to receive the other free end of the latch hook, and a trip cord attached to said trip lever for releasing it from the latch hook.

6. The structure of claim 5 together with a pair of scale relief chains having their upper ends connected to said lever, and hooks on the lower ends of the last mentioned chains, said cross bar having openings to removably receive the last mentioned hook and located at equal distances from the center of said cross bar.

References Cited in the file of this patent

UNITED STATES PATENTS

| | | |
|---|---|---|
| 1,984,606 | Thomas | Dec. 18, 1934 |
| 2,737,381 | Attaway | Mar. 6, 1956 |